United States Patent

Wess et al.

[11] 4,014,466
[45] Mar. 29, 1977

[54] CARRYING FRAME FOR FISHING POLES

[76] Inventors: Kenneth F. Wess, 3106 Lindenwood Drive; Charles Day, Ratliff Road, both of San Angelo, Tex. 76901

[22] Filed: Oct. 20, 1975

[21] Appl. No.: 624,267

[52] U.S. Cl. .......................... 224/45 R; 211/60 R
[51] Int. Cl.² ........................................ B65D 71/00
[58] Field of Search ............ 211/60 R, 60 G, 60 T, 211/65, 68, 177; 224/45 R, 5 E; 52/474, 365, 399; 40/155; 151/61–63

[56] References Cited

UNITED STATES PATENTS

| | | | |
|---|---|---|---|
| 2,707,052 | 4/1955 | Brown | 211/65 |
| 3,157,424 | 11/1964 | Hall | 211/60 R |
| 3,483,996 | 12/1969 | Scammon | 211/60 G |
| 3,731,817 | 5/1973 | Fowlkis et al. | 211/60 R |

FOREIGN PATENTS OR APPLICATIONS 559,144 6/1958 Canada .......................... 211/60 G Primary Examiner—Robert J. Spar
Assistant Examiner—Kenneth Noland
Attorney, Agent, or Firm—Clarence A. O'Brien; Harvey B. Jacobson

[57] ABSTRACT

An upstanding rectangular frame is provided including vertically spaced upper and lower elongated horizontal members and opposite end upstanding elongated members extending and interconnected between corresponding ends of the upper and lower members. Corresponding portions of the upstanding members are provided with vertically spaced pairs of clamp members for releasably clampingly engaging longitudinally spaced portions of elongated members such as fishing rods. The upper horizontal member of the frame has a handle portion supported therefrom centrally intermediate its opposite ends and the adjacent ends of the horizontal and upstanding members of the frame are securely but releasably secured together whereby the frame may be disassembled and stored in a compact state.

2 Claims, 4 Drawing Figures

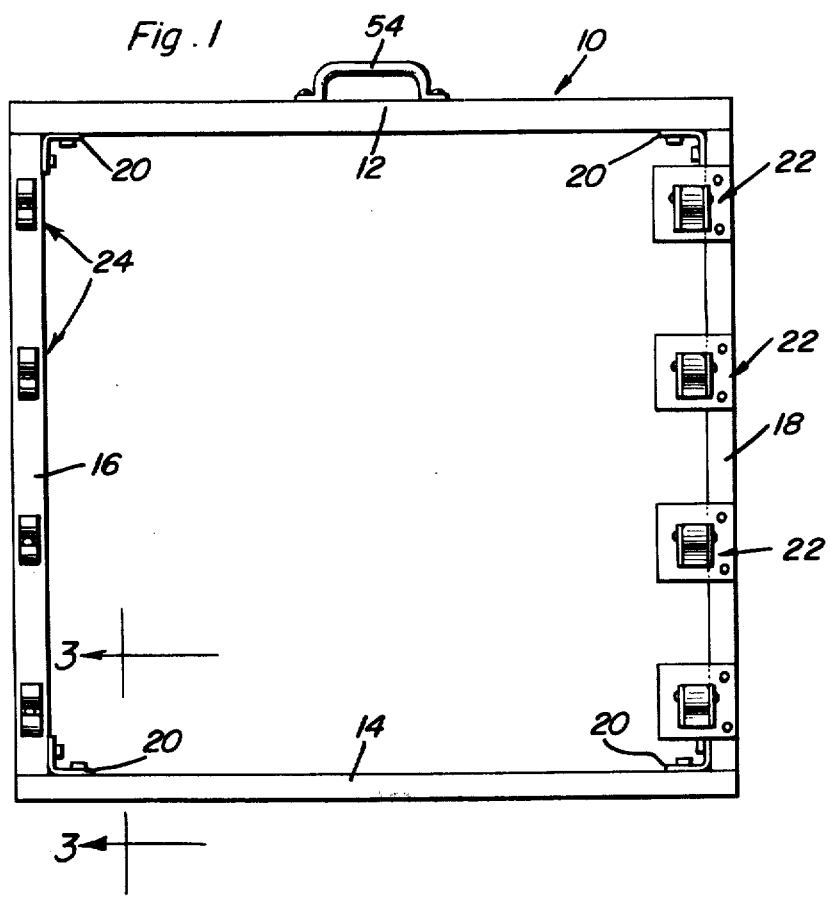
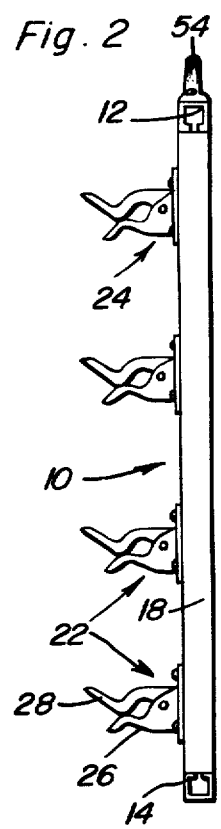
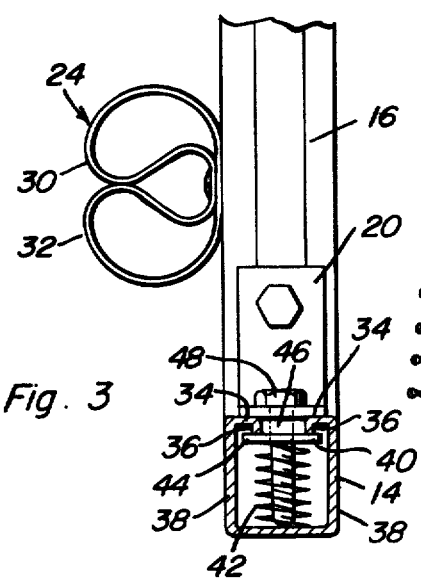
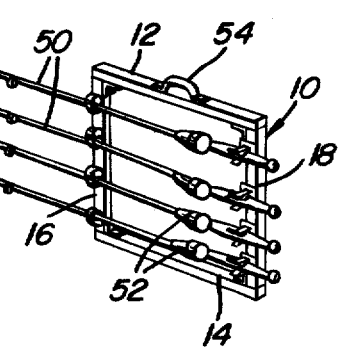

4,014,466

1

CARRYING FRAME FOR FISHING POLES

BACKGROUND OF THE INVENTION

Various forms of carrying devices for fishing poles and the like have been heretofore designed. However, most carrying devices of this type which have been previously known are not designed with both ease of transport and storage in an assembled condition as well as in a disassembled condition of prime concern. As a result, carrying devices which have been previously utilized for supporting a plurality of fishing poles have included certain operational drawbacks. Examples of various forms of carrying devices for fishing poles and the like are disclosed in U.S. Pat. Nos. 2,519,662, 2,595,230, 2,667,274 2,816,390, 3,088,583 and 3,399,009.

BRIEF DESCRIPTION OF THE INVENTION

The carrying frame of the instant invention has been designed so as to be as simple as possible in construction and yet sufficiently sturdy to carry a plurality of fishing rods in an efficient manner. In addition, the carrying frame is constructed in a manner whereby it may be readily disassembled for storage in a compact state and also whereby it may be readily transported from one location to another and temporarily stored, with a plurality of fishing rods supported therefrom, when in a fully assembled condition.

The main object of this invention is to provide a carrier for fishing rods, bows and other sporting equipment.

Another object of this invention is to provide a carrier constructed in a manner whereby it may be readily manually transported from one area to another while supporting a plurality of elongated articles therefrom.

Another important object of this invention is to provide a carrier in accordance with the preceding objects and constructed in a manner whereby it may be readily disassembled for storage in a compact state.

A still further object of this invention is to provide a carrier for fishing rods and bows, etc. capable of being utilized to support and store a plurality of fishing rods and/or bows in a temporary storage area.

A final object of this invention to be specifically enumerated herein is to provide a carrying frame in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the carrying frame of the instant invention;

FIG. 2 is an end elevational view of the frame as seen from the right side of FIG. 1;

FIG. 3 is an enlarged fragmentary vertical sectional view taken substantially upon the plane indicated by the section line 3—3 of FIG. 1; and

2

FIG. 4 is a perspective view of the carrying frame on a diminished scale and illustrating the manner in which a plurality of fishing rods may be supported therefrom.

DETAILED DESCRIPTION OF THE INVENTION

Referring now more specifically to the drawings the numeral 10 generally designates the carrying frame of the instant invention. The frame 10 includes an open rectangular frame including vertically spaced upper and lower members 12 and 14 having corresponding opposite ends between which a pair of upstanding elongated members 16 and 18 extend.

Four angle brackets 20 are utilized to secure adjacent ends of the members 12, 14, 16 and 18 together in order to define a rectangular frame.

The upstanding member 18 has a plurality of pivoted lever-type clamp assemblies generally referred to by the reference numerals 22 secured thereto at points spaced longitudinally therealong on one side of the upstanding member 18 and the member 16 has a plurality of spring-type clamp members referred to in general by the reference numerals 24 secured to the corresponding side thereof at points spaced longitudinally therealong. Each of the clamp assemblies 24 is horizontally aligned with a corresponding clamp assembly 22.

From FIG. 2 of the drawings it may be seen that each pivoted lever-type clamp assembly 22 includes a lower rigid jaw 26 and an upper pivoted and spring-biased jaw 28 co-acting with the jaw 26 to clampingly receive a generally cylindrically shaped object therebetween. Further, it may be seen from FIG. 3 of the drawings that each of the spring-type clamp assemblies 24 includes upper and lower spring jaw portions 30 and 32 between which a generally cylindrically shaped member may be clampingly engaged.

From FIG. 3 of the drawings it may be seen that the lower member 14 is generally C-shaped in cross sectional shape including first and second progressively inturned flanges 34 and 36 formed on the free ends of the arms 38 of the C-shaped member 14. Of course, the member 14 is hollow and therefore defines a channel member, the members 12, 16 and 18 also being similarly formed.

A threaded nut 40 is positioned in each end of the members 12, 14, 16 and 18 and is frictionally held in position by means of a compression spring 42. Each nut 40 includes a head or shoulder portion 44 which engages behind the free edges of the corresponding flanges 36 and an internally threaded sleeve portion 46 of non-circular cross section snugly received between the confronting surfaces of the corresponding flanges 36. A headed bolt 48 is secured through the corresponding flange of the associated angle bracket 20 and threaded into the corresponding nut 40. Therefore, the adjacent ends of the members 12, 14, 16 and 18 are rigidly, but removably, secured together.

With attention now invited more specifically to FIG. 4 of the drawings it may be seen that a plurality of fishing rods 50 may be supported from the frame 10 in an orderly manner with the handle portions of the rods 50 supported from the clamp assemblies 24 and the opposite end portions of the rods 50 supported from the clamp assemblies 24. This spacing between adjacent clamp members 22 and 24 is such that the reels 52 of the rods 50 are maintained in spaced apart relation. Further, the central portion of the upper horizontal member 12 is provided with a carrying handle 54 whereby the frame 10 may be readily transported, with the fishing rods supported therefrom, from one location to another. Further, the handle 54 may be utilized to hang the frame 10 from a suitable support member such as a wall provided with an appropriate hook to engage the handle 54. Also, the frame 10 may be placed upon the floor of a rear storage compartment of a vehicle in order that the rods 50 may be transported within a vehicle without becoming entangled. Still further, the frame 10 may be readily disassembled for storage in a compact state when not being utilized to support the rods 50.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A hand carrying device for supporting a plurality of elongated structures therefrom, said device including spaced portions thereof from which support structures comprising clamp holding members are mounted adapted to engage longitudinally spaced portions of elongated structures for removable support of the latter from said support structures, said carrying device comprising an upstanding rectangular frame including a pair of vertically spaced upper and lower elongated members and a pair of opposite end upstanding elongated members extending and interconnected between corresponding ends of said upper and lower members, said upstanding members comprising said spaced portions, said upper, lower and upstanding members comprising channel members of generally C-shape cross section with the free ends of the legs thereof each terminating in successive right angled inturned first and second flanges, threaded nut sleeves mounted in the ends of each of said elongated members including inner heads underlying the corresponding second flanges and non-circular shank portions slidingly received between the opposing surfaces of the corresponding second flanges with the latter preventing rotation of said sleeves, and angle braces connecting pairs of adjacent ends of said elongated members by means of threaded bolts secured through said angle braces and threadedly engaged in said sleeves.

2. The combination of claim 1 wherein said upper horizontal member includes a handle portion disposed centrally intermediate its opposite ends.

* * * * *